May 13, 1952  A. S. KROTZ  2,596,904
VEHICLE SUSPENSION

Filed Aug. 25, 1948  2 SHEETS—SHEET 1

Inventor
Alvin S. Krotz
By Harold S. Meyer
Atty

May 13, 1952     A. S. KROTZ     2,596,904
VEHICLE SUSPENSION

Filed Aug. 25, 1948     2 SHEETS—SHEET 2

Inventor
Alvin S. Krotz
By Harold S. Meyer
Att'y

Patented May 13, 1952

2,596,904

UNITED STATES PATENT OFFICE 2,596,904

VEHICLE SUSPENSION

Alvin S. Krotz, Akron, Ohio, assignor to The B. F. Goodrich Company, New York, N. Y., a corporation of New York Application August 25, 1948, Serial No. 45,991

8 Claims. (Cl. 267—21)

This invention relates to vehicle suspensions and especially to suspensions for vehicles which carry loads having a wide range of weights. The invention is also especially useful in vehicles having small clearances between the frame and axle.

Objects of the invention are to provide an improved vehicle suspension, to provide a variable spring rate suspension for cushioning vehicles carrying large and small loads, to provide for resiliently limiting the deflection of the wheels, to provide desirable automatic steering movement of the wheels during deflections thereof as when a vehicle rounds a curve, to provide for a desirable reaction of the vehicle to braking forces, to provide for obtaining different spring characteristics with small adjustments of the suspension system without necessitating replacement of the springs, to provide simplicity of construction and to provide for convenience and economy of manufacture and installation.

These and other objects will be apparent from the following description, reference being had to the drawings in which.

Figure 1:
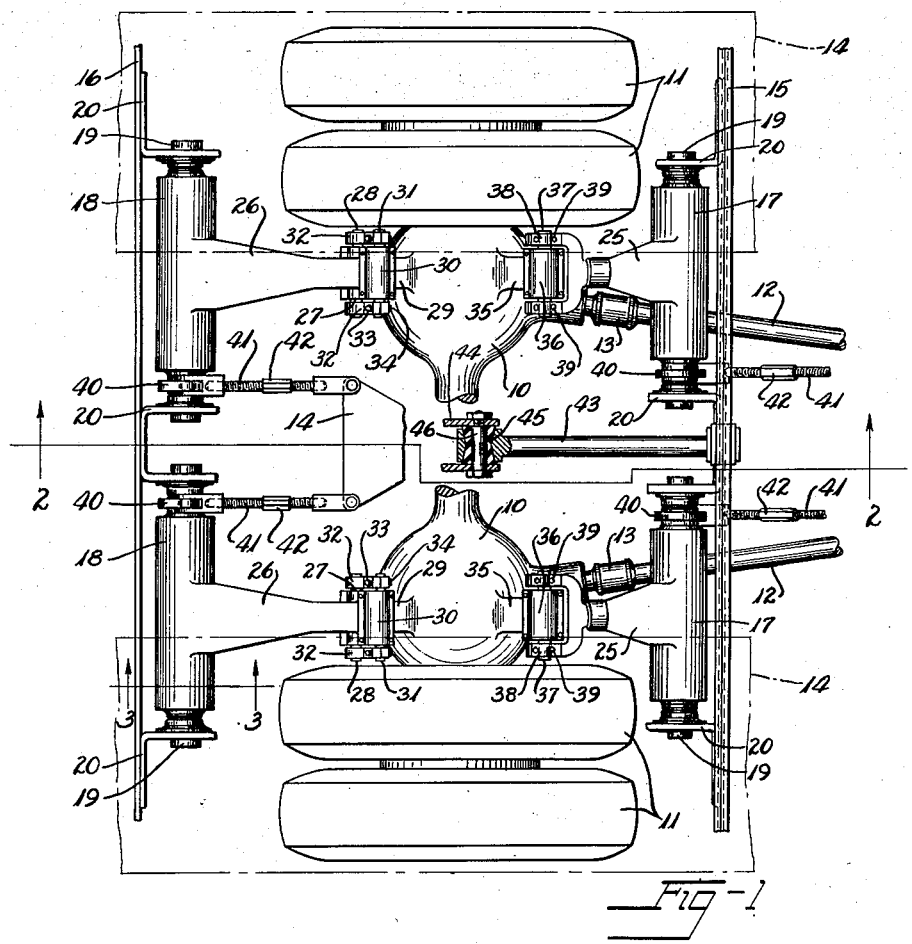
Fig. 1 is a plan view of a vehicle suspension constructed in accordance with and embodying the invention.

Referring to the drawings, an embodiment of the invention which may be used on a heavy duty vehicle such as a bus is shown. The invention is especially suitable for buses as it permits a large amount of unobstructed floor space because the springs are conveniently disposed alongside the axle and also because it provides effective cushioning of large loads as well as small loads.

The assembly shown in Fig. 1 has a wheel-supporting structure such as an axle housing 10 which connects dual wheels 11, 11 which are mounted on stub axles encased in the axle housing. The wheels 11, 11 may be driven by two engines disposed forward of the axle (to the right in Fig. 1). The engines propel drive shafts 12, 12 which extend rearward to universal joints 13, 13 which accommodate deflection and then extend into the axle housing 10 where they are geared to the stub axles for driving the wheels 11, 11.

A supported structure or frame 14 of the vehicle comprises a transverse member 15, forward of the axle housing 10 and a transverse member 16 to the rear of the axle housing which support the body of the vehicle or may be part of the body.

A pair of torsion spring assemblies 17, 17 is mounted on the forward transverse member 15 and another pair of torsion spring assemblies 18, 18 is mounted on the rear transverse member 16. Each of the spring assemblies 17, 17 and 18, 18 of each pair are preferably disposed at each side of the vehicle opposite to the spring assemblies of the other pair.

Figure 3:
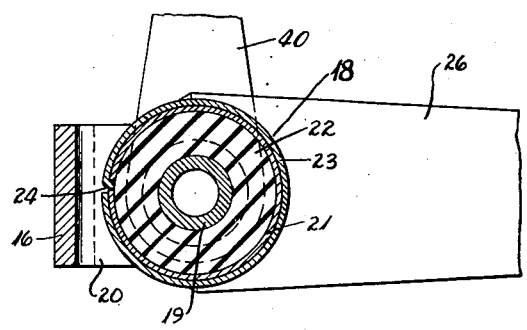
Fig. 3 is a section taken along line 3—3 of Fig. 1.

Each of the spring assemblies 17, 17 and 18, 18 has a spring as shown in Fig. 3 which has an inner shaft 19 which may be rotatably mounted on brackets 20, 20 mounted on the transverse members 15 and 16. A sleeve 21 which may be split is disposed about each shaft 19 and an annular elastic body of rubber-like material 22 is interposed between the sleeve and shaft. The body of rubber-like material 22 may be bonded by suitable means such as vulcanization to the shaft 19 and sleeve 21.

The sleeves 21, 21 are mounted fixedly in shells 23, 23 which have inwardly projecting edges 24, 24, bent into the space between the split portions of the sleeves. The forward spring assemblies 17, 17 have outwardly extending arms 25, 25 mounted on the shells 23, 23 and the rearward spring assemblies 18, 18 have arms 26, 26 mounted on the shells 23, 23 of the springs for turning the sleeves 21, 21 relative to the inner shafts 19, 19.

The arms 26, 26 extend forward toward the axle housing 10 in a substantially horizontal position and have bearings 27, 27 at the forward end for receiving pins 28, 28. Lugs 29, 29 are mounted on the axle housing 10 and have bearings 30, 30 for receiving pins 31, 31. Link members 32, 32 which may be split for clamping the pins 28, 28 and 31, 31 connect the arms 26, 26 and axle housing 10. The pins 28, 28 and 31, 31 are clamped between the split portions of the link members 32, 32 at the end portions and are held in clamping engagement by bolts and nuts 33 and 34. The link members 32, 32 preferably extend forward and upward from the arms 26, 26 to the lugs 29, 29 with an oblique angle between the arms and link members under normal load.

The arms 25, 25 of the forward spring assemblies 17, 17 extend rearwardly toward and are pivotally connected to the axle housing 10. It is desirable that the arms 25, 25 have an upward inclination from the spring toward the axle housing 10 when the vehicle is carrying a normal load. The arms 25, 25 may be forked at the axle housing 10 as shown in Fig. 1 and may embrace lugs 35, 35 mounted on the axle housing. The lugs 35, 35 contain bearings 36, 36 for receiving pins 37, 37 for rotation therein. The pins 37, 37 may be mounted in the forked arms 25, 25 and clamped therein by cap members 38, 38 held in the forked arms by bolts 39, 39.

The inner shafts 19, 19 of the springs have arms 40, 40 mounted thereon which extend radially outward and which are connected to the frame 14 by rods 41, 41. The arms 40, 40 may be non-rotatably secured to the shafts 19, 19 as by serrations disposed in apertures of the arms which fit around and intermesh with the shafts or by other suitable fasteners. The rods 41, 41 may be threaded and incorporate turnbuckles 42, 42 for adjusting the position of the inner shaft 19 to regulate the windup of the spring. As shown in the drawings the rods 41, 41 for the arms 40, 40 on the shafts 19, 19 for the rear springs may extend upward and the arms 40, 40 on the shafts 19, 19 for the forward springs may extend downward with the rods 41, 41 extending forward from the arms to a suitable portion of the frame (not shown).

A radius rod 43 is disposed forward of the axle housing 10 at or about the axis of the vehicle. The radius rod 43 is pivotally mounted at the forward end on the forward transverse member 15 of the frame while the other end is pivotally mounted on an arm 44 extending downwardly from the axle housing 10. The connection at the rear end of the radius rod 43 comprises a bushing 45 of resilient rubber or other rubber-like material in an aperture in the rod. A pin 46 is mounted on the radius rod 43 and is disposed for rotation in the bushing 45 which accommodates lateral tilting of the axle housing 10 relative to the frame 14. When the wheels 11, 11 on one side of the vehicle are deflected a greater amount than the wheels on the other side the axle housing 10 tends to tilt laterally and the resilient material of the bushing is distorted permitting freedom of movement of the axle housing without twisting of the radius rod 43.

In operation, the vehicle is cushioned during deflection of the wheels 11, 11 by twisting of the annular bodies 22, 22 of resilient rubber-like material in torsional shear. As the wheels 11, 11 are deflected and rise relative to the frame 14 the axle housing 10 moves in a path determined by the arms 25, 25 of the forward spring assemblies 17, 17 and by the radius rod 43. As the wheels 11, 11 rise in equal increments relative to the frame 14 the angle between the rearward arms 26, 26 and link members 32, 32 changes and the arms are turned through consecutively greater increments of rotation increasing the amount of windup in the springs which results in an increase in the stiffness of the springing. In addition the change in the angle between the arms 26, 26 and link members 32, 32 changes the length of the effective moment arm of the springs (designated AB in Fig. 2 for a normally loaded condition of the vehicle). In the embodiment shown in the drawing the effective moment arm decreases and the resistance to upward movement of the wheels 11, 11 increases as the wheels rise relative to the frame 14. The combination of these reactions to upward movement of the wheels 11, 11 provides a variable rate suspension with the springing resistance stiffening as the wheels approach the bump position which occurs when the link members 32, 32 and the arms 26, 26 approach alignment as shown in dot-dash lines in Fig. 2. The effective moment arm for the heavily loaded or bump position of the wheels (designated AC in Fig. 2) is much smaller than the effective moment arm AB for the normally loaded position of the wheels 11, 11 and the resistance of the spring to turning is greater because of the increased increments of rotation of the arms 26, 26, all of which provides a greater stiffness of springing than is provided at the normally loaded condition of the vehicle.

Figure 2:
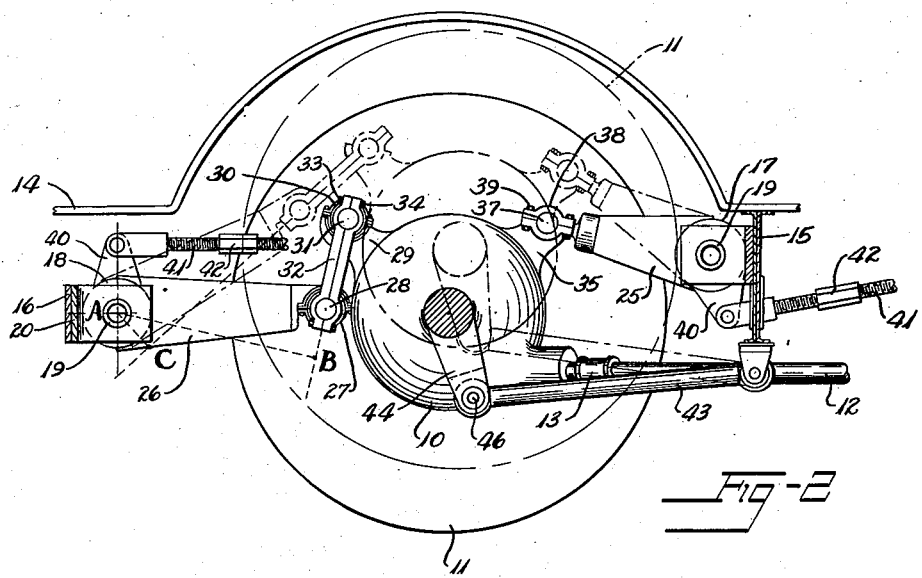
Fig. 2 is a section taken along line 2—2 of Fig. 1.

The wheel assembly shown is positioned on the vehicle aft of the front wheels and the arrangement as shown is conducive to easy steering of the vehicle because as the vehicle is turned into a curve the wheels tend to turn into the curve also. This movement will be apparent from observation of Fig. 2 which shows the relative positions of the wheels 11, 11 under normal load and at the bump position. The axle housing 10 and wheels 11, 11 are moved forward upon movement of the frame downward relative to the wheels and are moved rearward upon movement of the frame upward relative to the wheels 11, 11. The rearward movement can be partly attributed to the upward inclination of the arms 25, 25 of the forward spring assemblies 17, 17 as shown in Fig. 2. As the vehicle rises relative to the wheels 11, 11 the forward arms 25, 25 swing the wheels rearward.

The combination of these movements causes the wheels 11, 11 to steer into a curve because as the vehicle turns the centrifugal force tends to tilt the vehicle away from the axis about which the vehicle turns. The resultant downward movement of the frame relative to the outer wheels 11, 11 causes them to move forward and the resultant upward movement of the frame relative to the inner wheels causes them to move rearward and the two movements turn the axle housing 10 into the curve. The connection of the radius rod 43 to the axle housing 10 accommodates turning of the axle housing as the yieldable bushing 45 of resilient rubber-like material provides flexibility permitting tilting movement of the connection.

The forward arms 25, 25 are inclined forward and downward while the radius rod 43 is inclined forward and upward in a converging relationship with the forward arms. Upon upward movement of the axle housing 10 relative to the frame 14 the axle housing tilts in a clockwise direction as shown in Fig. 2 and the drive shafts 12, 12 are tilted downward which reduces the deflection which the universal joints 13, 13 must accommodate.

Figure 4:
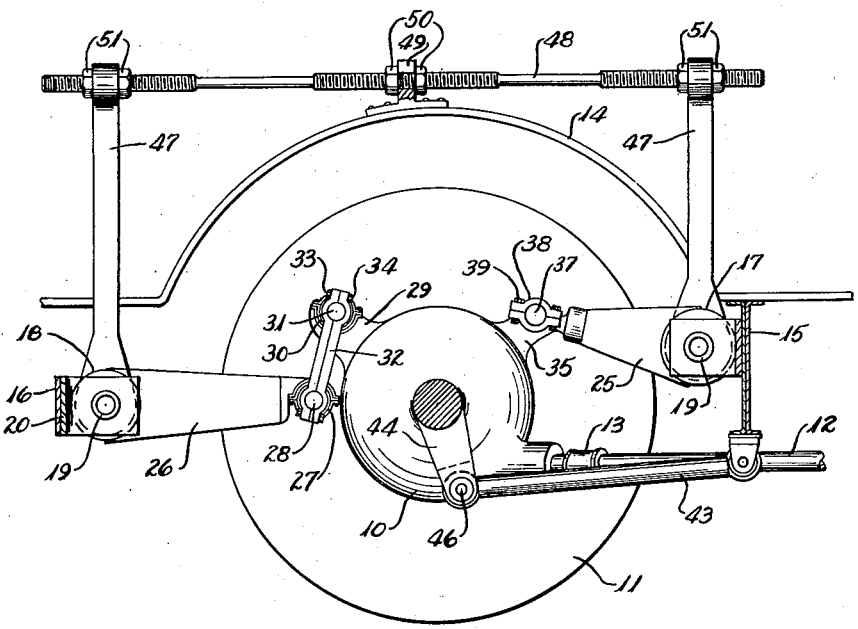
Fig. 4 is a view like Fig. 2 but showing a modification of the invention.

A modification is shown in Fig. 4 in which arms 47, 47 are mounted on the shafts 19, 19 of the springs and extend upward from the shafts. The arms 47, 47 are connected by a rod 48 which extends through an eye of an eye bracket 49 mounted on the frame 14 of the vehicle. The rod 48, 48 is threaded at the eye bracket 49 and is adjustably secured to the eye bracket by nuts 50, 50 threaded on a rod at opposite sides of the eye bracket. The arms 47, 47 also may be adjustably secured to the rods 48, 48 by nuts 51, 51 threaded on the rods. The arms 47, 47 have apertures at the end portions through which the rods 48, 48 extend and the rods have threaded portions adjacent the apertures on which the nuts 51, 51 may be threaded for adjustably clamping the arms on the rod.

In operation, the tendency for one of the arms 47, 47 to turn is counteracted by the other arm and the eye bracket 49 on the frame 14 or body of the vehicle is not subjected to the full magnitude of the forces. For example, if the wheels 11, 11 rise relative to the frame 14 the resilient bodies 22, 22 of rubber-like material of the springs tend to move the shafts 19, 19 in a direction which will move the arms 47, 47 in opposite directions and stress the rod 48 in tension. The only force imposed upon the eye bracket 49 is the difference in the forces exerted on the two springs rather than the sum of the forces exerted on the two springs. With the adjustment provided by the nuts 50, 50 and 51, 51 and by the threaded rod 48 each spring may be adjusted individually by nuts 51, 51 or may be adjusted together by turning the nuts 50, 50. The position of the adjusting nuts 50, 50 and 51, 51 above the wheels 11, 11 is also desirable because of their accessibility.

Variations may be made without departing from the invention as it is defined by the following claims.

I claim:

1. A vehicle suspension comprising a supported structure, a wheel-carrying structure extending transversely of said vehicle, a pair of torsion springs disposed at spaced-apart positions along said wheel-carrying structure, said springs having arms pivotally connecting said structures for cushioning relative movement thereof, a second pair of torsion springs disposed at positions opposing the positions of springs of said first pair of torsion springs, each of the springs of said second pair being mounted on one structure and connected to the other structure by linkages for transmitting relative movement of said structures of said spring, each of said linkages comprising an arm mounted on one of the springs of said second pair and a link pivotally connected to said arm and to the other structure, and a rod member pivotally connected to said supported structure and to said wheel-carrying structure at a position between said spaced-apart positions and spaced vertically from the arm connections for limiting the fore and aft movement of said wheel-carrying structure relative to said supported structure and for turning said wheel-carrying structure about the pivotal connection of said arms to said wheel-carrying structure to augment the variation in the relative angular positions of each said link relative to the connecting arm in response to relative movement of said structures.

2. A cushioning suspension comprising supported and supporting structures, an arm connecting said structures and pivoted on one of said structures for constraining relative motion of said structures in predetermined paths, a link having a pivotal connection with one of said structures and another link pivotally connected to said link and to the other of said structures, at least one of the pivotal connections of the links comprising a torsion spring, said torsion spring comprising inner and outer members mounted for relative rotative movement upon relative deflection of said structures, and a body of resilient rubber material disposed between and mounted on said inner and outer members for resisting relative deflection of said structures in torsional shear, the pivotal connections of said links with said structures being at points which have a different spacing at different load conditions, and said links being of such lengths that at a normal load they make an angle with one another approaching a right angle and at an extreme load they approach aligned positions whereby the effective moment arm of said torsion spring is greatly decreased and its effective spring rate to resist further relative motion of said structures is greatly increased under said extreme load.

3. A cushioning suspension comprising supported and supporting structures, an arm connecting said structures and pivoted on one of said structures for constraining relative motion of said structures in predetermined paths, a link having a pivotal connection with one of said structures and another link pivotally connected to said link and to the other of said structures, at least one of the pivotal connections of the links comprising a torsion spring for resisting relative deflection of said structures by rotative stress on said torsion spring, the pivotal connections of said links with said structures being at points which have a different spacing at different load conditions, and said links being of such lengths that at a normal load they make an angle with one another approaching a right angle and at an extreme load they approach aligned positions whereby the effective moment arm of said torsion spring is greatly decreased and its effective spring rate to resist further relative motion of said structures is greatly increased under said extreme load.

4. A cushioning suspension comprising supported and supporting structures, a torsion spring mounted on one of said structures, an arm mounted on said torsion spring and connected to the other of said structures for resisting relative motion of said structures by rotative stress on said spring and for constraining the relative motion of said structures to predetermined paths, a link having a pivotal connection with one of said structures and another link pivotally connected to said link and to the other of said structures, at least one of the pivotal connections of the links comprising a second torsion spring resisting relative deflection of said structures by rotative stress on said second torsion spring, the pivotal connections of said links with the said structures being at points which have a different spacing at different load conditions, and said links being of such lengths that at a normal load they make an angle with one another approaching a right angle and at an extreme load they approach aligned positions whereby the effective moment arm of the said second torsion spring is greatly decreased and its effective spring rate to resist further relative motion of said structures is greatly increased under said extreme load.

5. A cushioning suspension comprising supported and supporting structures, a pair of arms, each of said arms having one end pivotally connected to one of said structures and the other end pivotally connected to the other of said structures for constraining relative motion of said structures in predetermined paths, said arms being in converging relationship and the pivotal connections of said arms to said structures having different axes individual to each arm about which said arms may swing to provide relative turning movement of said structures, a link having a pivotal connection with one of said structures and another link pivotally connected to said link and to the other of said structures, at least one of the pivotal connections of the links comprising a torsion spring resisting relative deflection of said structures by rotative stress on said torsion spring, the pivotal connections of said links with the said structures being at points which have a different spacing at different load conditions, and said links being of such lengths that at a normal load they make an angle with one another approaching a right angle and at an extreme load they approach aligned positions whereby the effective moment arm of said torsion spring is greatly decreased and its effective spring rate to reset further relative motion of said structure is greatly increased under said extreme load.

6. A cushioning suspension comprising supported and supporting structures, a pair of arms, each of said arms having one end pivotally connected to one of said structures and the other end pivotally connected to the other of said structures for constraining relative motion of said structures in predetermined paths, one of said arms being longer than the other of said arms to provide relative turning movement of said structures, a link having a pivotal connection with one of said structures and another link pivotally connected to said link and to the other of said structures, at least one of the pivotal connections of the links comprising a torsion spring resisting relative deflection of said structures by rotative stress on said torsion spring, the pivotal connections of said links with said structures being at points which have a different spacing at different load conditions, and said links being of such lengths that at a normal load they make an angle with one another approaching a right angle and at an extreme load they approach aligned positions whereby the effective moment arm the said torsion spring is greatly decreased and its effective spring rate to resist further relative motion of said structures is greatly increased under said extreme load.

7. A vehicle suspension comprising a supported structure, a wheel-carrying structure, torsion springs disposed forward and aft of said wheel-carrying structure, each of said torsion springs comprising an inner and an outer member, a body of resilient rubber-like material disposed between and mounted on the said inner and outer members for resisting relative rotative movement of said members in torsional shear, one of said members being mounted on said supported structure, each of said torsion springs having an arm mounted on the other of said members and extending toward said wheel-carrying structure, one of the arms being connected to said wheel-carrying structure, for constraining relative movement of the structures in predetermined paths, a link pivotally connected to the other of said arms and to said wheel-carrying structure, the pivotal connection of said link with said wheel-carrying structure and the torsion spring which has the arm connected to said link having a different spacing at different loads, and the pivotally connected arm and link being of such lengths that at a normal load they make an angle with one another approaching a right angle and at an extreme load they approach aligned positions whereby the effective moment arm of the last-mentioned torsion spring is greatly decreased and its effective spring rate to resist further relative motion of said structures is greatly increased under said extreme load.

8. A vehicle suspension comprising a supported structure and a wheel-carrying structure, a pair of arms disposed one above the other, each of said arms having one end pivotally connected to said supported structure and the other end pivotally connected to said wheel-carrying structure for constraining movement of said wheel-carrying structure relative to said supported structure in a predetermined up and down path, a link having a pivotal connection with said wheel-carrying structure and another link pivotally connected to said link and to said supported structure, at least one of the pivotal connections of the links comprising a torsion spring resisting deflection of said wheel-carrying structure relative to said supported structure by rotative stress on said torsion spring, the pivotal connections of said links with the structures being at points which have a different spacing at different load conditions, and said links being of such lengths that at a normal load they make an angle with one another approaching a right angle and at an extreme load they approach aligned positions whereby the effective moment arm of said torsion spring is greatly decreased and its effective spring rate to resist further relative movement of said structures is greatly increased under said extreme load.

ALVIN S. KROTZ.

REFERENCES CITED

The following references are of record in the file of this patent:

UNITED STATES PATENTS

| Number | Name | Date |
| --- | --- | --- |
| 1,989,837 | Walters | Feb. 7, 1935 |
| 2,165,608 | Booth | July 11, 1939 |
| 2,177,893 | Kortz | Oct. 31, 1939 |
| 2,182,248 | Chayne | Dec. 5, 1939 |
| 2,207,465 | Leighton | July 9, 1940 |
| 2,226,047 | Borgward | Dec. 24, 1940 |
| 2,236,410 | Leighton | Mar. 25, 1941 |
| 2,246,821 | Utz | June 24, 1941 |
| 2,256,069 | Wagner | Sept. 16, 1941 |
| 2,266,280 | Sherman | Dec. 16, 1941 |
| 2,300,844 | Olley | Nov. 3, 1942 |
| 2,328,740 | Reimspiess | Sept. 7, 1943 |
| 2,330,482 | Fageol | Sept. 28, 1943 |
| 2,367,817 | Brown | Jan. 23, 1945 |